(12) United States Patent
Cohen et al.

(10) Patent No.: US 12,007,671 B2
(45) Date of Patent: Jun. 11, 2024

(54) SYSTEMS AND CAMERAS FOR TILTING A FOCAL PLANE OF A SUPER-MACRO IMAGE

(71) Applicant: Corephotonics Ltd., Tel Aviv (IL)

(72) Inventors: Noy Cohen, Tel Aviv (IL); Michael Scherer, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 18/257,110

(22) PCT Filed: Jun. 7, 2022

(86) PCT No.: PCT/IB2022/055306
§ 371 (c)(1),
(2) Date: Jun. 13, 2023

(87) PCT Pub. No.: WO2022/259154
PCT Pub. Date: Dec. 15, 2022

(65) Prior Publication Data
US 2023/0400753 A1 Dec. 14, 2023

Related U.S. Application Data

(60) Provisional application No. 63/288,047, filed on Dec. 10, 2021, provisional application No. 63/274,700, (Continued)

(51) Int. Cl.
G03B 17/12 (2021.01)
G03B 5/00 (2021.01)
(Continued)

(52) U.S. Cl.
CPC .............. G03B 17/12 (2013.01); G03B 5/00 (2013.01); G03B 17/17 (2013.01); G03B 30/00 (2021.01);
(Continued)

(58) Field of Classification Search
None
See application file for complete search history.

(56) References Cited

U.S. PATENT DOCUMENTS 3,085,354 A 4/1963 Rasmussen et al.
3,584,513 A 6/1971 Gates
(Continued)

FOREIGN PATENT DOCUMENTS

CN 101276415 A 10/2008
CN 201514511 U 6/2010
(Continued)

OTHER PUBLICATIONS

Statistical Modeling and Performance Characterization of a Real-Time Dual Camera Surveillance System, Greienhagen et al., Publisher: IEEE, 2000, 8 pages.
(Continued)

Primary Examiner — Stephone B Allen
Assistant Examiner — Tamara Y. Washington
(74) Attorney, Agent, or Firm — Nathan & Associates; Menachem Nathan

(57) ABSTRACT

Systems having a Wide/Ultra-Wide camera, a folded Tele camera with an optical path folding element and a Tele lens module, a lens actuator for moving the Tele lens module for focusing to object-lens distances between 3.0 cm and 35 cm with an object-to-image magnification between 1:5 and 25:1, and an application processor (AP), wherein the AP is configured to analyze image data from the UW camera to define a Tele capture strategy for a sequence of Macro images with a focal plane slightly shifted from one captured Macro image to another and to generate a new Macro image from this sequence, and wherein the focal plane and a depth of field of the new Macro image can be controlled continuously.

37 Claims, 8 Drawing Sheets

Related U.S. Application Data filed on Nov. 2, 2021, provisional application No. 63/208,186, filed on Jun. 8, 2021.

(51) Int. Cl.
  *G03B 17/17* (2021.01)
  *G03B 30/00* (2021.01)
  *H04N 23/55* (2023.01)
  *H04N 23/67* (2023.01)
  *H04N 23/69* (2023.01)
  *H04N 23/695* (2023.01)
  *H04N 23/90* (2023.01)

(52) U.S. Cl.
  CPC ............ *H04N 23/55* (2023.01); *H04N 23/67* (2023.01); *H04N 23/69* (2023.01); *H04N 23/695* (2023.01); *H04N 23/90* (2023.01); *G03B 2205/0046* (2013.01); *G03B 2205/0069* (2013.01)

(56) References Cited

U.S. PATENT DOCUMENTS

| | | |
|---|---|---|
| 3,941,001 A | 3/1976 | LaSarge |
| 4,199,785 A | 4/1980 | McCullough et al. |
| 4,792,822 A | 12/1988 | Akiyama et al. |
| 5,005,083 A | 4/1991 | Grage et al. |
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,331,465 A | 7/1994 | Miyano |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,502,537 A | 3/1996 | Utagawa |
| 5,657,402 A | 8/1997 | Bender et al. |
| 5,682,198 A | 10/1997 | Katayama et al. |
| 5,768,443 A | 6/1998 | Michael et al. |
| 5,892,855 A | 4/1999 | Kakinami et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,201,533 B1 | 3/2001 | Rosenberg et al. |
| 6,208,765 B1 | 3/2001 | Bergen |
| 6,211,668 B1 | 4/2001 | Duesler et al. |
| 6,215,299 B1 | 4/2001 | Reynolds et al. |
| 6,222,359 B1 | 4/2001 | Duesler et al. |
| 6,268,611 B1 | 7/2001 | Pettersson et al. |
| 6,520,643 B1 | 2/2003 | Holman et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,752,969 B1 | 6/2014 | Kane et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 2002/0005902 A1 | 1/2002 | Yuen |
| 2002/0030163 A1 | 3/2002 | Zhang |
| 2002/0054214 A1 | 5/2002 | Yoshikawa |
| 2002/0063711 A1 | 5/2002 | Park et al. |
| 2002/0075258 A1 | 6/2002 | Park et al. |
| 2002/0122113 A1 | 9/2002 | Foote |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0156751 A1 | 8/2003 | Lee et al. |
| 2003/0160886 A1 | 8/2003 | Misawa et al. |
| 2003/0202113 A1 | 10/2003 | Yoshikawa |
| 2004/0008773 A1 | 1/2004 | Itokawa |

(56) References Cited

U.S. PATENT DOCUMENTS

| | | |
|---|---|---|
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0239313 A1 | 12/2004 | Godkin |
| 2004/0240052 A1 | 12/2004 | Minefuji et al. |
| 2005/0013509 A1 | 1/2005 | Samadani |
| 2005/0046740 A1 | 3/2005 | Davis |
| 2005/0134697 A1 | 6/2005 | Mikkonen et al. |
| 2005/0141390 A1 | 6/2005 | Lee et al. |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2005/0248667 A1 | 11/2005 | Schweng et al. |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0126737 A1 | 6/2006 | Boice et al. |
| 2006/0170793 A1 | 8/2006 | Pasquarette et al. |
| 2006/0175549 A1 | 8/2006 | Miller et al. |
| 2006/0181619 A1 | 8/2006 | Liow et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0126911 A1 | 6/2007 | Nanjo |
| 2007/0127040 A1 | 6/2007 | Davidovici |
| 2007/0159344 A1 | 7/2007 | Kisacanin |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0088942 A1 | 4/2008 | Seo |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0102948 A1 | 4/2009 | Scherling |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0168135 A1 | 7/2009 | Yu et al. |
| 2009/0200451 A1 | 8/2009 | Conners |
| 2009/0219547 A1 | 9/2009 | Kauhanen et al. |
| 2009/0234542 A1 | 9/2009 | Orlewski |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0134621 A1 | 6/2010 | Namkoong et al. |
| 2010/0165131 A1 | 7/2010 | Makimoto et al. |
| 2010/0196001 A1 | 8/2010 | Ryynänen et al. |
| 2010/0202068 A1 | 8/2010 | Ito |
| 2010/0238327 A1 | 9/2010 | Griffith et al. |
| 2010/0246024 A1 | 9/2010 | Aoki et al. |
| 2010/0259836 A1 | 10/2010 | Kang et al. |
| 2010/0265331 A1 | 10/2010 | Tanaka |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0121666 A1 | 5/2011 | Park et al. |
| 2011/0128288 A1 | 6/2011 | Petrou et al. |
| 2011/0164172 A1 | 7/2011 | Shintani et al. |
| 2011/0221599 A1 | 9/2011 | Högasten |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0285714 A1 | 11/2011 | Swic et al. |
| 2011/0298966 A1 | 12/2011 | Kirschstein et al. |
| 2012/0014682 A1 | 1/2012 | David et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0148215 A1 | 6/2013 | Mori et al. |
| 2013/0148854 A1 | 6/2013 | Wang et al. |
| 2013/0155176 A1 | 6/2013 | Paripally et al. |
| 2013/0163085 A1 | 6/2013 | Lim et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0229544 A1 | 9/2013 | Bando |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0258048 A1 | 10/2013 | Wang et al. |
| 2013/0270419 A1 | 10/2013 | Singh et al. |
| 2013/0278785 A1 | 10/2013 | Nomura et al. |
| 2013/0286221 A1 | 10/2013 | Shechtman et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0160311 A1 | 6/2014 | Hwang et al. |
| 2014/0192224 A1 | 7/2014 | Laroia |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2014/0376090 A1 | 12/2014 | Terajima |
| 2014/0379103 A1 | 12/2014 | Ishikawa et al. |
| 2015/0002683 A1 | 1/2015 | Hu et al. |
| 2015/0002684 A1 | 1/2015 | Kuchiki |
| 2015/0042870 A1 | 2/2015 | Chan et al. |
| 2015/0070781 A1 | 3/2015 | Cheng et al. |
| 2015/0092066 A1 | 4/2015 | Geiss et al. |

(56) References Cited

U.S. PATENT DOCUMENTS

| | | |
|---|---|---|
| 2015/0103147 A1 | 4/2015 | Ho et al. |
| 2015/0110345 A1 | 4/2015 | Weichselbaum |
| 2015/0124059 A1 | 5/2015 | Georgiev et al. |
| 2015/0138381 A1 | 5/2015 | Ahn |
| 2015/0145965 A1 | 5/2015 | Livyatan et al. |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0198464 A1 | 7/2015 | El Alami |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0296112 A1 | 10/2015 | Park et al. |
| 2015/0316744 A1 | 11/2015 | Chen |
| 2015/0334309 A1 | 11/2015 | Peng et al. |
| 2016/0044250 A1 | 2/2016 | Shabtay et al. |
| 2016/0062136 A1* | 3/2016 | Nomura ............... H04N 23/60 359/557 |
| 2016/0070088 A1 | 3/2016 | Koguchi |
| 2016/0154066 A1 | 6/2016 | Hioka et al. |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0238834 A1 | 8/2016 | Erlich et al. |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0301868 A1 | 10/2016 | Acharya et al. |
| 2016/0342095 A1 | 11/2016 | Bieling et al. |
| 2016/0353008 A1 | 12/2016 | Osborne |
| 2016/0353012 A1 | 12/2016 | Kao et al. |
| 2016/0381289 A1 | 12/2016 | Kim et al. |
| 2017/0001577 A1 | 1/2017 | Seagraves et al. |
| 2017/0019616 A1 | 1/2017 | Zhu et al. |
| 2017/0070731 A1 | 3/2017 | Darling et al. |
| 2017/0094187 A1 | 3/2017 | Sharma et al. |
| 2017/0124987 A1 | 5/2017 | Kim et al. |
| 2017/0150061 A1 | 5/2017 | Shabtay et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0219749 A1 | 8/2017 | Hou et al. |
| 2017/0242225 A1 | 8/2017 | Fiske |
| 2017/0276954 A1 | 9/2017 | Bajorins et al. |
| 2017/0289458 A1 | 10/2017 | Song et al. |
| 2018/0013944 A1 | 1/2018 | Evans et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0109660 A1 | 4/2018 | Yoon et al. |
| 2018/0109710 A1 | 4/2018 | Lee et al. |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0184010 A1 | 6/2018 | Cohen et al. |
| 2018/0198897 A1 | 7/2018 | Tang et al. |
| 2018/0241922 A1 | 8/2018 | Baldwin et al. |
| 2018/0295292 A1 | 10/2018 | Lee et al. |
| 2018/0300901 A1 | 10/2018 | Wakai et al. |
| 2018/0307005 A1 | 10/2018 | Price et al. |
| 2018/0329281 A1 | 11/2018 | Ye |
| 2018/0368656 A1 | 12/2018 | Austin et al. |
| 2019/0100156 A1 | 4/2019 | Chung et al. |
| 2019/0121103 A1 | 4/2019 | Bachar et al. |
| 2019/0121216 A1 | 4/2019 | Shabtay et al. |
| 2019/0130822 A1 | 5/2019 | Jung et al. |
| 2019/0213712 A1 | 7/2019 | Lashdan et al. |
| 2019/0215440 A1 | 7/2019 | Rivard et al. |
| 2019/0222758 A1 | 7/2019 | Goldenberg et al. |
| 2019/0228562 A1 | 7/2019 | Song |
| 2019/0297238 A1 | 9/2019 | Klosterman |
| 2020/0103726 A1 | 4/2020 | Shabtay et al. |
| 2020/0104034 A1 | 4/2020 | Lee et al. |
| 2020/0134848 A1 | 4/2020 | El-Khamy et al. |
| 2020/0220956 A1 | 7/2020 | Fujisaki et al. |
| 2020/0221026 A1 | 7/2020 | Fridman et al. |
| 2020/0264403 A1 | 8/2020 | Bachar et al. |
| 2020/0389580 A1 | 12/2020 | Kodama et al. |
| 2021/0180989 A1 | 6/2021 | Fukumura et al. |
| 2021/0333521 A9 | 10/2021 | Yedid et al. |
| 2022/0252963 A1 | 8/2022 | Shabtay et al. |

FOREIGN PATENT DOCUMENTS

| | | |
|---|---|---|
| CN | 102215373 A | 10/2011 |
| CN | 102739949 A | 10/2012 |
| CN | 102982518 A | 3/2013 |
| CN | 103024272 A | 4/2013 |
| CN | 203406908 U | 1/2014 |
| CN | 103841404 A | 6/2014 |
| CN | 205301703 U | 6/2016 |
| CN | 105827903 A | 8/2016 |
| CN | 105847662 A | 8/2016 |
| CN | 107608052 A | 1/2018 |
| CN | 107682489 A | 2/2018 |
| CN | 109729266 A | 5/2019 |
| CN | 111988454 A | 11/2020 |
| EP | 1536633 A1 | 6/2005 |
| EP | 1780567 A1 | 5/2007 |
| EP | 2523450 A1 | 11/2012 |
| JP | S59191146 A | 10/1984 |
| JP | 04211230 A | 8/1992 |
| JP | H07318864 A | 12/1995 |
| JP | 08271976 A | 10/1996 |
| JP | 2002010276 A | 1/2002 |
| JP | 2003298920 A | 10/2003 |
| JP | 2003304024 A | 10/2003 |
| JP | 2004056779 A | 2/2004 |
| JP | 2004133054 A | 4/2004 |
| JP | 2004245982 A | 9/2004 |
| JP | 2005099265 A | 4/2005 |
| JP | 2005122084 A | 5/2005 |
| JP | 2005321592 A | 11/2005 |
| JP | 2006237914 A | 9/2006 |
| JP | 2006238325 A | 9/2006 |
| JP | 2007228006 A | 9/2007 |
| JP | 2007306282 A | 11/2007 |
| JP | 2008076485 A | 4/2008 |
| JP | 2008271026 A | 11/2008 |
| JP | 2010204341 A | 9/2010 |
| JP | 2011055246 A | 3/2011 |
| JP | 2011085666 A | 4/2011 |
| JP | 2011138407 A | 7/2011 |
| JP | 2011203283 A | 10/2011 |
| JP | 2012132739 A | 7/2012 |
| JP | 2013101213 A | 5/2013 |
| JP | 2013106289 A | 5/2013 |
| JP | 2016105577 A | 6/2016 |
| JP | 2017146440 A | 8/2017 |
| KR | 20070005946 A | 1/2007 |
| KR | 20090058229 A | 6/2009 |
| KR | 20100008936 A | 1/2010 |
| KR | 20110080590 A | 7/2011 |
| KR | 20130104764 A | 9/2013 |
| KR | 1020130135805 A | 11/2013 |
| KR | 20140014787 A | 2/2014 |
| KR | 101428042 B1 | 8/2014 |
| KR | 101477178 B1 | 12/2014 |
| KR | 20140144126 A | 12/2014 |
| KR | 20150118012 A | 10/2015 |
| KR | 20170105236 A | 9/2017 |
| KR | 20180120894 A | 11/2018 |
| KR | 20130085116 A | 6/2019 |
| WO | 2000027131 A2 | 5/2000 |
| WO | 2004084542 A1 | 9/2004 |

(56) References Cited

FOREIGN PATENT DOCUMENTS

| | | |
|---|---|---|
| WO | 2004102246 A1 | 11/2004 |
| WO | 2006008805 A1 | 1/2006 |
| WO | 2010122841 A1 | 10/2010 |
| WO | 2014072818 A2 | 5/2014 |
| WO | 2017025822 A1 | 2/2017 |
| WO | 2017037688 A1 | 3/2017 |
| WO | 2018130898 A1 | 7/2018 |

OTHER PUBLICATIONS

A 3MPixel Multi-Aperture Image Sensor with 0.7 μm Pixels in 0.11 μm CMOS, Fife et al., Stanford University, 2008, 3 pages.

Dual camera intelligent sensor for high definition 360 degrees surveillance, Scotti et al., Publisher: IET, May 9, 2000, 8 pages.

Dual-sensor foveated imaging system, Hua et al., Publisher: Optical Society of America, Jan. 14, 2008, 11 pages.

Defocus Video Matting, McGuire et al., Publisher: ACM SIGGRAPH, Jul. 31, 2005, 11 pages.

Compact multi-aperture imaging with high angular resolution, Santacana et al., Publisher: Optical Society of America, 2015, 10 pages.

Multi-Aperture Photography, Green et al., Publisher: Mitsubishi Electric Research Laboratories, Inc., Jul. 2007, 10 pages.

Multispectral Bilateral Video Fusion, Bennett et al., Publisher: IEEE, May 2007, 10 pages.

Super-resolution imaging using a camera array, Santacana et al., Publisher: Optical Society of America, 2014, 6 pages.

Optical Splitting Trees for High-Precision Monocular Imaging, McGuire et al., Publisher: IEEE, 2007, 11 pages.

High Performance Imaging Using Large Camera Arrays, Wilburn et al., Publisher: Association for Computing Machinery, Inc., 2005, 12 pages.

Real-time Edge-Aware Image Processing with the Bilateral Grid, Chen et al., Publisher: ACM SIGGRAPH, 2007, 9 pages.

Superimposed multi-resolution imaging, Carles et al., Publisher: Optical Society of America, 2017, 13 pages.

Viewfinder Alignment, Adams et al., Publisher: Eurographics, 2008, 10 pages.

Dual-Camera System for Multi-Level Activity Recognition, Bodor et al., Publisher: IEEE, Oct. 2014, 6 pages.

Engineered to the task: Why camera-phone cameras are different, Giles Humpston, Publisher: Solid State Technology, Jun. 2009, 3 pages.

International Search Report and Written Opinion in related PCT application PCT/IB2022/055306, dated Dec. 2, 2022.

ESR in related EP patent application 22819728.1, dated Feb. 1, 2024.

* cited by examiner

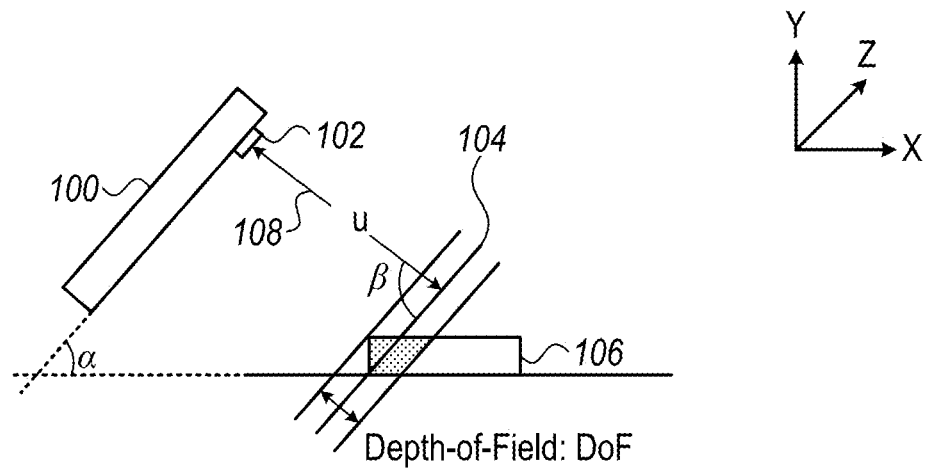
FIG. 1A   *Known Art*
FIG. 1B
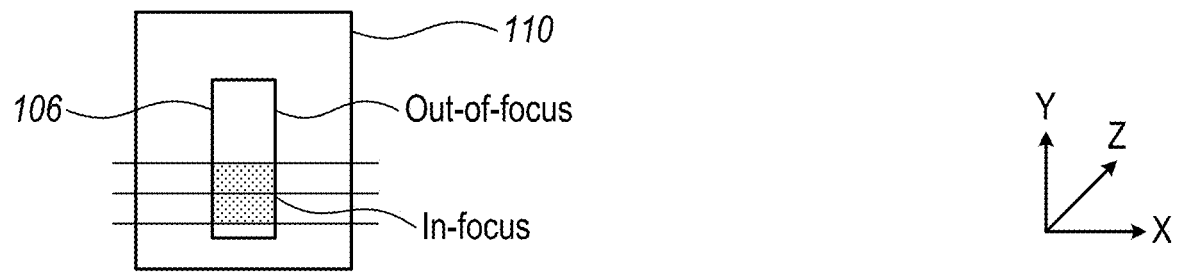

FIG. 3A Known Art

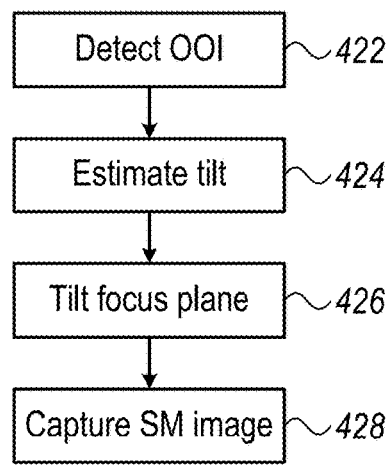
FIG. 4C
FIG. 5A
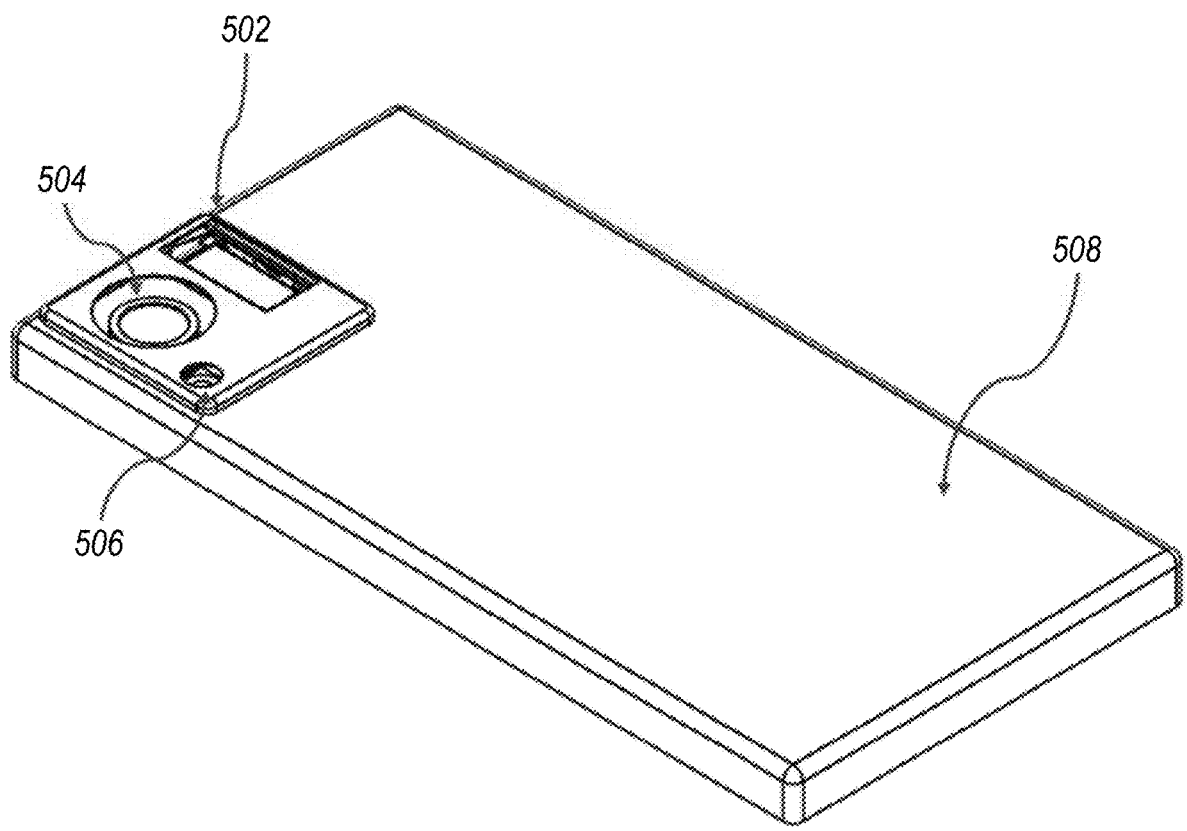

SYSTEMS AND CAMERAS FOR TILTING A FOCAL PLANE OF A SUPER-MACRO IMAGE

CROSS REFERENCE TO RELATED APPLICATIONS

This is a 371 application from international patent application No. PCT/IB2022/055306 filed Jun. 7, 2022, which claims the benefit of priority from U.S. provisional patent application Nos. 63/208,186 filed Jun. 8, 2021, 63/274,700 filed Nov. 2, 2021 and 63/288,047 filed Dec. 10, 2021, which are incorporated herein by reference in their entirety.

FIELD

The subject matter disclosed herein relates in general to macro images and in particular to methods for obtaining such images with mobile telephoto ("Tele") cameras.

BACKGROUND

Multi-cameras (of which a "dual-camera" having two cameras is an example) are now widespread in portable electronic mobile devices (or just "mobile devices", e.g. smartphones, tablets, etc.). A multi-camera usually comprises a wide field-of-view (or "wide angle") $FOV_W$ camera ("Wide" or "W" camera), and at least one additional camera, e.g. with a narrower (than $FOV_W$) FOV, i.e. a "Tele" (or "T") camera with $FOV_T$. A triple camera including a W camera, an ultra-wide (UW) camera and a double-folded Tele camera is shown in FIG. 5A-B.

A "Macro-photography" mode is becoming a popular differentiator. "Macro-photography" refers to photographing objects that are close to the camera, so that an image recorded on the image sensor is nearly as large as the actual object photographed. The ratio of object size to image size is the object-to-image magnification ("M").

A Macro camera providing large M can be realized with a mobile devices's Tele camera. Because of its large M, the camera can be referred to as "super-Macro camera" or "SM camera" and the image can be referred to as "super-Macro image" or "SM image". Tele cameras and methods for mobile super-Macro-photography are described for example in co-owned international patent application PCT/IB2021/054186.

Because of a Tele camera's large effective focal length (EFL) of 7 mm or more, Tele cameras focused to close objects have a very shallow depth of field (DOF), see Table 1. The DOF is the distance between the nearest and the farthest objects that are in acceptably sharp focus in an image. Consequently, capturing Macro images in a Macro-photography mode with a Tele camera is very challenging. For example, for obtaining more beneficial lightning or more convenient capture experience, one may want to capture an object which is oriented at some angle θ with respect to the mobile device's rear surface and the Macro camera's focal plane (see FIG. 1A). This may result in an image that is only partially in focus. In standalone cameras such as digital single-lens reflex cameras (DSLRs), this challenge is solved by "Tilt—shift lenses" that allow to tilt the focal plane. However, there is no satisfactory solution to this challenge in miniature cameras of the type included in smartphones.

It would be beneficial to have a super-Macro camera in mobile devices that can tilt its focal plane.

SUMMARY

In various embodiments there is provided a camera, comprising: an object side optical path folding element (O-OPFE) for folding a first optical path (OP1) to a second optical path (OP2); a lens; an image side optical path folding element (I-OPFE) for folding OP2 to a third optical path (OP3), wherein OP1 and OP2 and OP3 are perpendicular to each other; an I-OPFE actuator; and an image sensor with an image plane oriented parallel to a X-Y plane in an exemplary orthogonal XYZ coordinate system, wherein the camera is a super-Macro (SM) camera and has a focal plane, wherein in a zero-tilt focal plane position the focal plane is parallel to a X-Z plane, wherein in a zero-tilt I-OPFE position the I-OPFE forms an angle of degrees with both the X-axis and the Z-axis and is parallel to the Y-axis, wherein the I-OPFE actuator is operative to tilt the focal plane around a first focal plane rotation axis that is parallel to the Z-axis by rotational actuation of the I-OPFE around a first I-OPFE rotation axis that is parallel to the Y-axis, and/or to tilt the focal plane around a second focal plane rotation axis parallel to the X-axis by rotational actuation of the I-OPFE around a second I-OPFE rotation axis that is parallel to the zero-tilt I-OPFE position and perpendicular to the Y-axis.

In some embodiments, OP1 and OP3 are oriented parallel to the Y-axis and OP2 is oriented parallel to the X-axis, wherein the image sensor is oriented parallel to the X-Z plane, wherein the I-OPFE actuator is operative to tilt the focal plane around the first focal plane rotation axis by rotational actuation of the I-OPFE around a third I-OPFE rotation axis that is parallel to the Z-axis, and/or to tilt the focal plane around the second focal plane rotation axis by rotational actuation of the I-OPFE around a fourth I-OPFE rotation axis that is parallel to the zero-tilt I-OPFE position and perpendicular to the Z-axis.

In some embodiments, the SM camera is focused to object-lens distances of 3.0-15 cm.

In some embodiments, the SM camera is focused to object-lens distances of 15-50 cm.

In some embodiments, the focal plane is tilted by 0-20 degrees around the first focal plane rotation axis and/or the second focal plane rotation axis.

In some embodiments, the I-OPFE is tilted by 0-40 degrees around the first I-OPFE rotation axis or the third I-OPFE rotation axis for tilting the focal plane by 0-20 degrees around the first focal plane rotation axis, and/or the I-OPFE is tilted by 0-40 degrees around the second I-OPFE rotation axis or the fourth I-OPFE rotation axis for tilting the focal plane by 0-20 degrees around the second focal plane rotation axis. In some embodiments, the I-OPFE is tilted by 0-60 degrees around the first I-OPFE rotation axis or the third I-OPFE rotation axis for tilting the focal plane by 0-40 degrees around the first focal plane rotation axis and/or the I-OPFE is tilted by 0-60 degrees around the second I-OPFE rotation axis or the fourth I-OPFE rotation axis for tilting the focal plane by 0-40 degrees around the second focal plane rotation.

In some embodiments, the focal plane is tilted by 0-40 degrees around the first focal plane rotation axis and/or the second focal plane rotation axis. In some embodiments, the focal plane is tilted by 0-60 degrees around the first focal plane rotation axis and/or the second focal plane rotation axis. In some embodiments, the focal plane is tilted by 0-80 degrees around the first focal plane rotation axis and/or the second focal plane rotation axis.

In some embodiments, calibration data is used to calculate control signals for tilting the focal plane around the first focal plane rotation axis and the second focal plane rotation axis, and the calibration data is dependent on the distance between the SM camera and an object to be captured.

In some embodiments, a first rotation stroke around the first or the second or the third or the fourth I-OPFE rotation axis is required for tilting the focal plane around the first focal plane rotation axis or the second focal plane rotation axis by a particular focal plane tilt stroke when the focal plane is located at a first distance from the SM camera, a second rotation stroke around the first or the second or the third or the fourth I-OPFE rotation angle is required for tilting the focal plane around the first focal plane rotation axis or the second focal plane rotation axis by the same particular focal plane tilt stroke when the focal plane is located at a second distance from the SM camera, the second distance is larger than the first distance, and the first rotation stroke is smaller than the second rotation stroke.

In some embodiments, the SM camera has an effective focal length (EFL) of 7-10 mm. In some embodiments, the SM camera has an EFL of 10-20 mm. In some embodiments, the SM camera has an EFL of 20-40 mm.

In some embodiments, the I-OPFE actuator is a voice coil motor.

In some embodiments, the I-OPFE is a mirror.

In some embodiments, the O-OPFE is a prism.

In some embodiments, the lens is partitioned into two lens groups, wherein a first lens is located at an object side of the O-OPFE and a second lens group is located between an image side of the O-OPFE and an object side of the I-OPFE.

In some embodiments, the SM camera is a scanning camera that scans a scene with a respective SM field-of-view.

In some embodiments, the SM camera can be switched between two or more discrete zoom states.

In some embodiments, the SM camera can be switched continuously between a minimum zoom state and a maximum zoom state.

In some embodiments, a zoom factor of a maximum zoom state is twice a zoom factor of a minimum zoom state.

In some embodiments, a zoom factor of a maximum zoom state is 3 times larger than a zoom factor of a minimum zoom state.

In various embodiments, there is provided a mobile device comprising a camera as above or below and including an application processor (AP) configured to control the tilting of the focal plane.

In some embodiments, the mobile device is a smartphone.

In some embodiments, the AP is configured to use calibration data including rotation angles of the first and/or the second and/or the third and/or the fourth I-OPFE rotation axes, and object-lens distances for controlling the tilting of the focal plane around the first and/or the second focal plane rotation axes.

In some embodiments, the AP is configured to control the tilting of the focal plane according to a user input.

In some embodiments, the AP is configured to run an algorithm to tilt the focal plane automatically.

In some embodiments, the AP is additionally configured to automatically capture an image or a stream of images after the focal plane is tilted.

In some embodiments, the focal plane is tilted so that an object of interest captured with the SM camera is entirely in-focus.

In some embodiments, the focal plane is tilted so that an object of interest captured with the SM camera has a specific amount of out-of-focus deblur.

In some embodiments, a mobile device further comprises a Wide camera and/or an Ultra-Wide camera, wherein the AP is additionally configured to analyze image data from any of the SM camera, the Wide camera, or the Ultra-Wide camera for tilting the focal plane automatically.

In some embodiments, the image data is photodiode autofocus image data. In some embodiments, the analysis of image data uses a saliency map and/or an object detection algorithm.

In some embodiments, the AP is configured to analyse image data from the Wide camera or the Ultra-Wide camera to steer a field-of-view (FOV) of the scanning camera towards a specific segment within a FOV of the Wide camera.

In some embodiments, the AP is configured to analyse image data from the Wide camera or the Ultra-Wide camera to switch the SM camera to a specific zoom state for capturing Macro images which have a specific magnification and a specific field-of-view.

In various embodiments there is provided a method, comprising: providing an electronic mobile device that includes a Wide camera for capturing a Wide image with a respective Wide field of view ($FOV_W$), a SM camera for capturing a SM image with a respective SM field of view smaller than $FOV_W$, wherein the SM camera is configured to tilt its focal plane, and a processor; and configuring the processor to autonomously tilt the focal plane of the SM camera according to an analysis that uses Wide image data and/or SM image data and to autonomously capture SM images at a given focal plane tilt.

In some embodiments, the tilting of the focal plane is performed so that a captured SM image is entirely in-focus.

In some embodiments, the tilting of the focal plane is performed so that a captured SM image has a specific amount of out-of-focus deblur.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated by like numerals. Elements in the drawings are not necessarily drawn to scale.

FIG. 1A shows an exemplary SM capture scenario known in the art;

FIG. 1B shows a SM image captured in a Portrait mode according to the scenario shown in FIG. 1A;

FIG. 3A shows an example of a known art double-folded camera in a cross-sectional view;

FIG. 4C shows an embodiment of a method for automatic control of focal plane tilting disclosed herein;

FIG. 5A shows an example of a mobile device that includes a double-folded SM camera with a tiltable focal plane as disclosed herein;

DETAILED DESCRIPTION

Figure 2A:
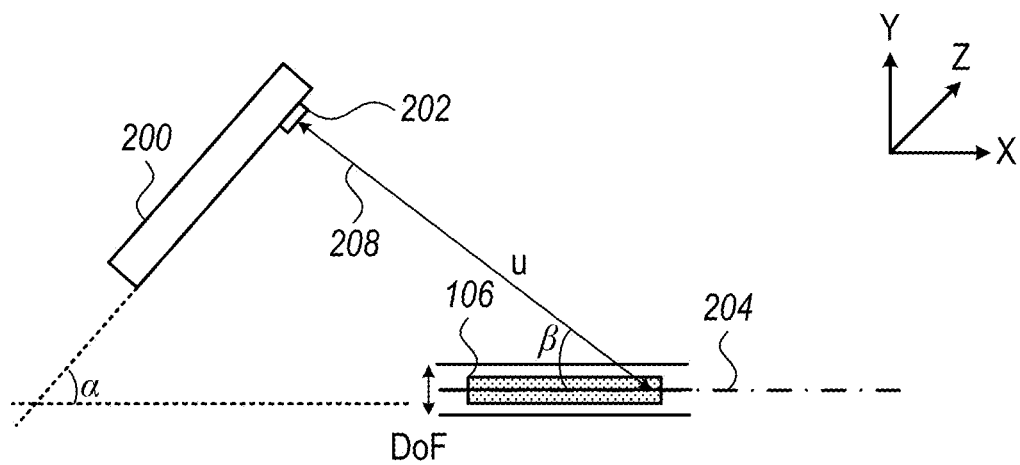
FIG. 2A shows exemplarily a SM image capture scenario as disclosed herein.

Cameras and images below qualify as "SM" if they support the two criteria:
M of 1:5-25:1.
Capture at an object-lens distance in the range of 30 mm-750 mm with an EFL in the range of 7 mm-50 mm.

A magnification of 1:5 and 25:1 refers respectively to a ratio of the physical size of the captured object being 1 and 25 to a size of the image of the captured object being 5 and 1, respectively.

It is noted that the above SM definition refers to both camera specifications (e.g. EFL in the range of 7 mm-50 mm) and image (or scene) specifications (e.g. object-lens distance in the range of 30 mm-750 mm). In particular, this means that a same camera may be used for image capture both in SM scenes (e.g. a scene with an exemplary object-lens distance of 100 mm) as well in other scenes (e.g. a scene with an exemplary object-lens distance of 2 m). When capturing SM scenes, the camera is referred to as SM camera. When capturing other scenes, the camera is referred to as Tele camera.

Table 1 shows the depth of field (DOF) in mm of a SM camera as function of its EFL (in mm) and an object's distance from the camera ("object-lens distance" or "u") in cm. For calculating DOF, a f number of f/3 and a circle of confusion of 1.5 μm was assumed. The DOF is presented for a range of EFL=8 mm-40 mm (column) and u=2 cm-150 cm (row).

TABLE 1

| | u(cm) | | | | | | |
|---|---|---|---|---|---|---|---|
| EFL (mm) | 2 | 10 | 15 | 20 | 50 | 100 | 150 |
| 8 | 0.056 | 1.406 | 3.164 | 5.625 | 35.156 | 140.625 | 316.406 |
| 12 | 0.025 | 0.625 | 1.406 | 2.500 | 15.625 | 62.500 | 140.625 |
| 15 | 0.016 | 0.400 | 0.900 | 1.600 | 10.000 | 40.000 | 90.000 |
| 20 | | 0.225 | 0.506 | 0.900 | 5.625 | 22.500 | 50.625 |
| 25 | | 0.240 | 0.540 | 0.960 | 6.000 | 24.000 | 54.000 |
| 30 | | 0.167 | 0.375 | 0.667 | 4.167 | 16.667 | 37.500 |
| 35 | | 0.122 | 0.276 | 0.490 | 3.061 | 12.245 | 27.551 |
| 40 | | 0.094 | 0.211 | 0.375 | 2.344 | 9.375 | 21.094 |

FIG. 1A shows an exemplary SM capture scenario known in the art. Mobile device 100 (e.g. a smartphone) includes a SM camera 102 that has a focal plane 104. Focal plane 104 is oriented in parallel to a rear surface of mobile device 100 and has a certain DOF. The DOF extends to both sides of focal plane 104. SM camera 102 captures an object 106. Mobile device 100 is oriented at an angle α with respect to the orientation of object 106. Because of the shallow DOF (see Table 1), only parts of object 106 may lie within the DOF region and may be in focus (dotted area of object 106). Other parts of object 106 may lie outside the DOF region and may be out of focus (white area of object 106). Focal plane 104 forms an angle β=90 degrees with a normal 108 of mobile device 100's rear surface. Mobile device 100 is shown in "Portrait mode" orientation as known in the art, meaning that a length dimension of a camera image is parallel to a length dimension of the object. In other embodiments, mobile device 100 may be in "Landscape mode" orientation as known in the art.

FIG. 1B shows a SM image 110 captured in a Portrait mode according to the scenario shown in FIG. 1A. Only segments of object 106 that were within the DOF are in-focus, and the segments of object 106 that were outside of the DOF are out-of-focus. In this scenario, the DOF of the SM camera prevents all-in-focus object capture in a direction parallel to the image's Y-axis. In other scenarios, the DOF of the SM camera may prevent all-in-focus object capturing in a perpendicular direction that is parallel to the image's X-axis.

FIG. 2A shows exemplarily a SM image capture scenario as disclosed herein. Mobile device 200 (e.g. a smartphone) includes a SM camera 202 with a tiltable focal plane 204. "Tiltable" refers to the fact that focal plane 204 can be tilted to have an orientation that is not parallel to mobile device 200. Focal plane 104 forms an angle β<90 degrees with a normal 208 of mobile device 200's rear surface.

SM camera 202 captures object 106. As in the scenario of FIG. 1A, mobile device 200 is oriented at an angle α with respect to the orientation of object 106. However and in contrast, focal plane 204 of SM camera 202 is tilted around a rotation axis parallel to the Z-axis so that focal plane 204 is oriented parallel to object 106. Despite the shallow DOF, all segments of object 106 lie within the DOF region and are thus in focus. Like mobile device 100 in FIG. 1A, mobile device 200 is shown in Portrait mode orientation.

Figure 2B:
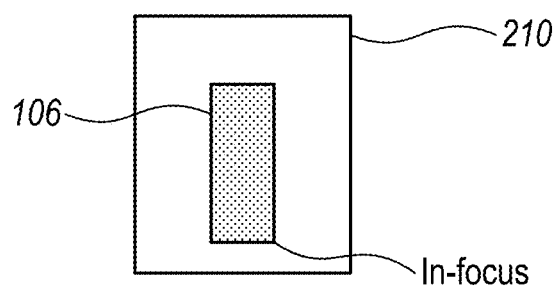
FIG. 2B shows a SM image captured in a Portrait mode according to the scenario shown in FIG. 2A.

FIG. 2B shows a SM image 210 captured in a Portrait mode according to the scenario shown in FIG. 2A. All segments of object 106 are in focus.

FIG. 3A shows an example of a first example of a known art double-folded camera numbered 300 in a cross-sectional view. Camera 300 includes a first object-side optical path folding element ("object OPFE" or "O-OPFE", for example a prism or a mirror) 302, a lens 304, a second image-side OPFE ("image OPFE" or "I-OPFE"—for example a mirror or a prism) 306 and an image sensor 308. Image sensor 308 is oriented in a plane parallel to the X-Y plane. Camera 300 has a focal plane 310 that is oriented parallel to the X-Z plane, i.e. perpendicular to image sensor 308 and parallel to a rear surface of a mobile device (not shown) that hosts camera 300. The optical path ("OP") of camera 300 is folded twice, from a first OP ("OP1") 312 that is perpendicular to focal plane 310 and parallel to the Y-axis, to a second OP ("OP2") 314 that is parallel to focal plane 310 and parallel to the X-axis, and then to a third OP ("OP3") 316 that is perpendicular to focal plane 310 and parallel to the Z-axis. I-OPFE 306 is oriented at an angle of 45 degrees with respect to image sensor 308 and with respect to both OP2 314 and OP3 316. In the following, this orientation of I-OPFE 306 is referred to as an I-OPFE's "zero-position" or "zero-tilt position". In a second example of a known art double folded camera (not shown), OP3 316 is oriented parallel to OP1 312 (i.e. parallel to the Y-axis) and image sensor 308 may be oriented in a plane parallel to the X-Z plane.

Figure 3B:
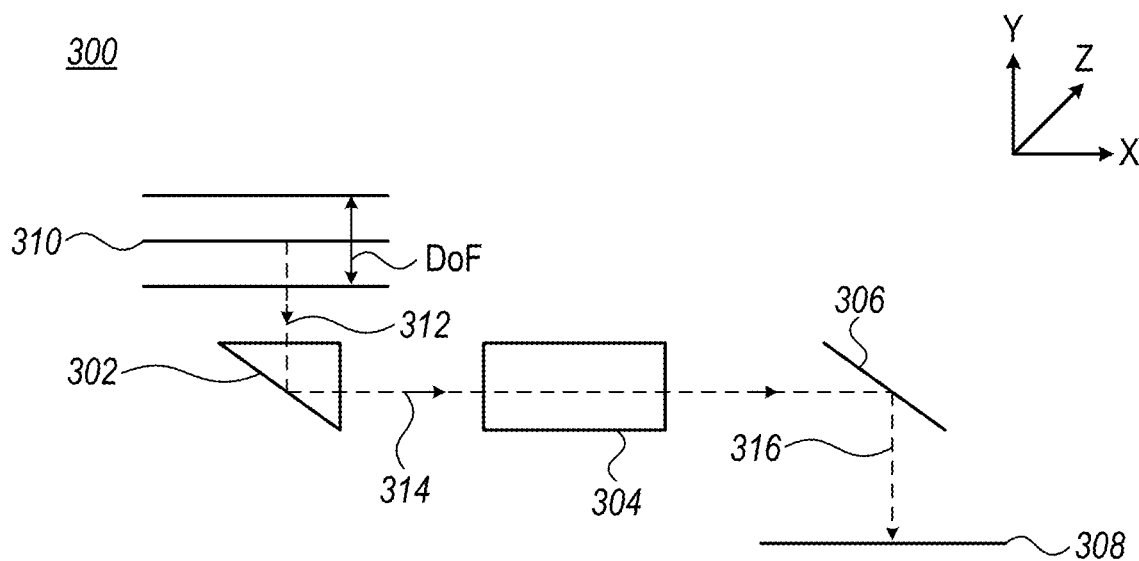
FIG. 3B shows an example of a double folded camera with a tiltable focal plane disclosed herein in a cross-sectional view.
Figure 3B:
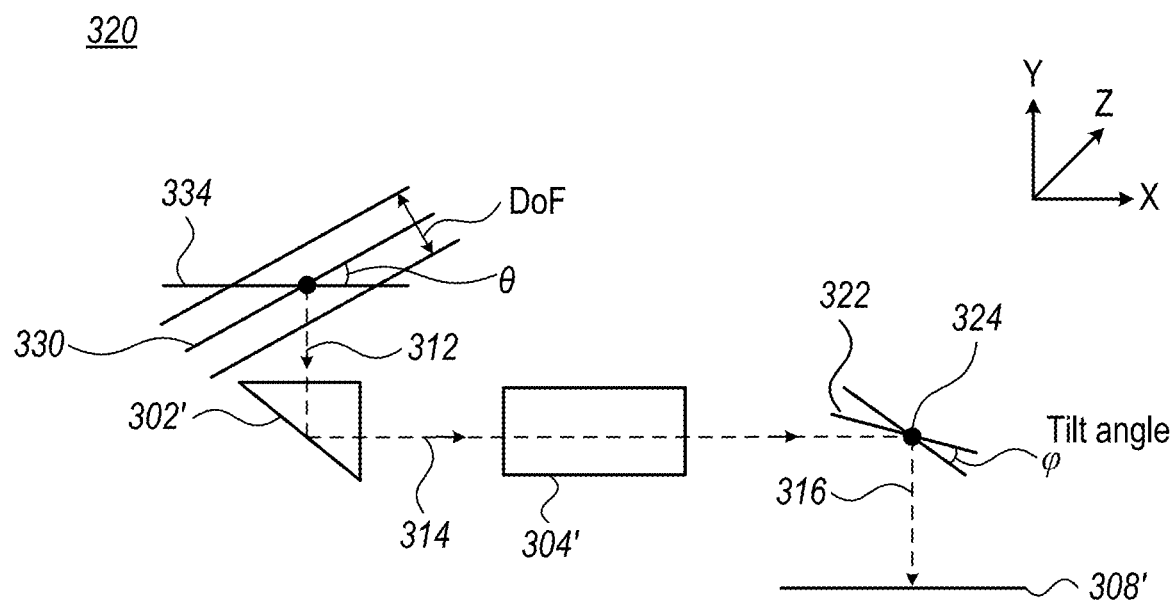

FIG. 3B shows an example of a first example of a double folded camera 320 with a tiltable focal plane 330 disclosed herein in a cross-sectional view. Similar to camera 300, camera 320 includes an O-OPFE 302', a lens 304' and an image sensor 308' which may or may not be identical with respective elements in camera 300. In addition, camera 320 includes a tiltable I-OPFE 322 (for example a mirror or a prism). In other embodiments, lens 304' may be partitioned into two or more lens groups (not shown), wherein a first lens group including one or more lens elements may be located at an object side of O-OPFE 302' and a second lens group including one or more lens elements may be located at an image side of O-OPFE 302' and at an object side of tiltable I-OPFE 322. In yet other embodiments (not shown), lens 304' may be located at an object side of O-OPFE 302', i.e. no lens elements may be located at an image side of O-OPFE 302'. The OP of camera 320 is folded twice, with identical partition into three OPs as shown in FIG. 3A. In particular, this means that image sensor 308' is oriented parallel to the X-Y plane and that tiltable focal plane 330 (in a zero-position) is oriented parallel to the X-Z plane. Tiltable I-OPFE 322 is shown in a zero-tilt position (like 306 in FIG. 3A) and in a tilted position with a tilt angle of $\varphi$ with respect to its zero-tilt position. In a zero-tilt position, tiltable I-OPFE 322 is oriented parallel to the Y-axis and oriented at an angle of 45 degrees with respect to image sensor 308' and to OP2 314 (which is parallel to the X-axis) and OP3 316 (which is parallel to the Z-axis).

Here and in the following, a first I-OPFE tilt angle "$\varphi$" is defined by the rotation angle of I-OPFE 322 around a first I-OPFE rotation axis 324 that is parallel to the Y-axis and which may intersect the geometrical center of the reflecting surface of I-OPFE 322. By tilting I-OPFE 322 around first I-OPFE rotation axis 324, tiltable focal plane 330 is tilted around a first focal plane tilt axis that is parallel to the Z-axis.

A second I-OPFE tilt angle is defined by the rotation angle of I-OPFE 322 around a second I-OPFE rotation axis (not shown) that is parallel to I-OPFE 322's zero-tilt position, i.e. second I-OPFE rotation axis forms an angle of 45 degrees with both the X-axis and the Z-axis and is perpendicular to the Y-axis. By tilting I-OPFE 322 around the second I-OPFE rotation axis, tiltable focal plane 330 is tilted around a second focal plane tilt axis that is parallel to the X-axis.

Depending on an orientation of an object that is to be captured such as object 106, it may be desired to tilt focal plane 330 around the first focal plane tilt axis, around the second focal plane tilt axis, or around a combination of the two. Given an orientation of a particular object that is to be captured such as object 106, it may be desired to tilt focal plane 330 around the first focal plane tilt axis when a mobile device including camera 320 (such as mobile device 700) is held in a Portrait mode (or orientation) as known in the art for image capture, and it may be desired to tilt focal plane 330 around the second focal plane tilt axis when a mobile device including camera 320 is held in a Landscape mode as known in the art for image capture, or vice versa. This means that the decision whether to tilt the focal plane around the first or the second tilt axis depends both on the orientation of an object to be captured and on the orientation of the camera hosting mobile device.

For tilting a focal plane of a second example double folded camera (i.e. OP3 being parallel to the Y-axis and the image sensor being oriented in a plane parallel to the X-Z plane) around a first focal plane tilt axis that is parallel to the Z-axis, the I-OPFE may be tilted around an I-OPFE tilt axis that is parallel to the Z-axis. For tilting a focal plane of a second example double folded camera around a second focal plane tilt axis that is parallel to the X-axis, the I-OPFE may be tilted around an I-OPFE tilt axis that is parallel to the I-OPFE as well as oriented perpendicular to the Z-axis and forming an axis of 45 degrees with respect to the X-axis and the Y-axis.

Tiltable focal plane 330 of camera 320 is a tilted focal plane that is not perpendicular to OP 312, but forms an angle $\theta$ with a plane 334 that is oriented normal to OP 312. With reference to FIG. 1A and FIG. 2A, camera 320 can be used to capture an object such as 106 entirely in focus, if focal plane tilting is performed so that $\theta=\alpha$ is approximately fulfilled (a being the angle between mobile device 200 and object 106, see FIG. 2A). "Approximately fulfilled" means here that because of the finite thickness of DOF (as shown in FIG. 1A and FIG. 2A), an object like object 106 can be captured entirely in focus also at an angle $\theta=\alpha\pm\Delta$. The magnitude of $\Delta$ depends on angle $\alpha$ and on object-lens distance "u".

For a tiltable focal plane such as 330, the object-lens distance u for an object in focus is measured along OP 312 from the FOV center to the camera lens. As can be seen in FIG. 3B, the tilting of the focal plane does not change u. In double folded camera 320, consecutive OPs (such as OP1 and OP2, OP2 and OP3 etc.) are oriented perpendicular to each other. In other examples, consecutive OPs may be oriented to each other at another angle, e.g. varying from degrees by 10 degrees or 20 degrees or more. In particular, here an O-OPFE and/or an I-OPFE in a zero-tilt position may be oriented so that it folds an optical path towards the another angle.

Figure 4A:
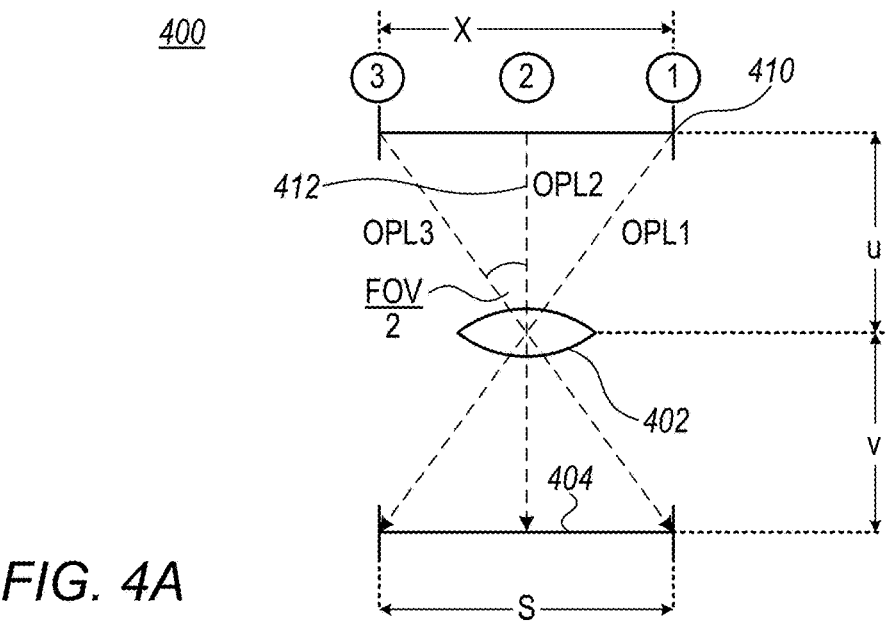
FIG. 4A shows exemplarily a camera disclosed herein in a zero-tilt focal plane position.
Figure 4B:
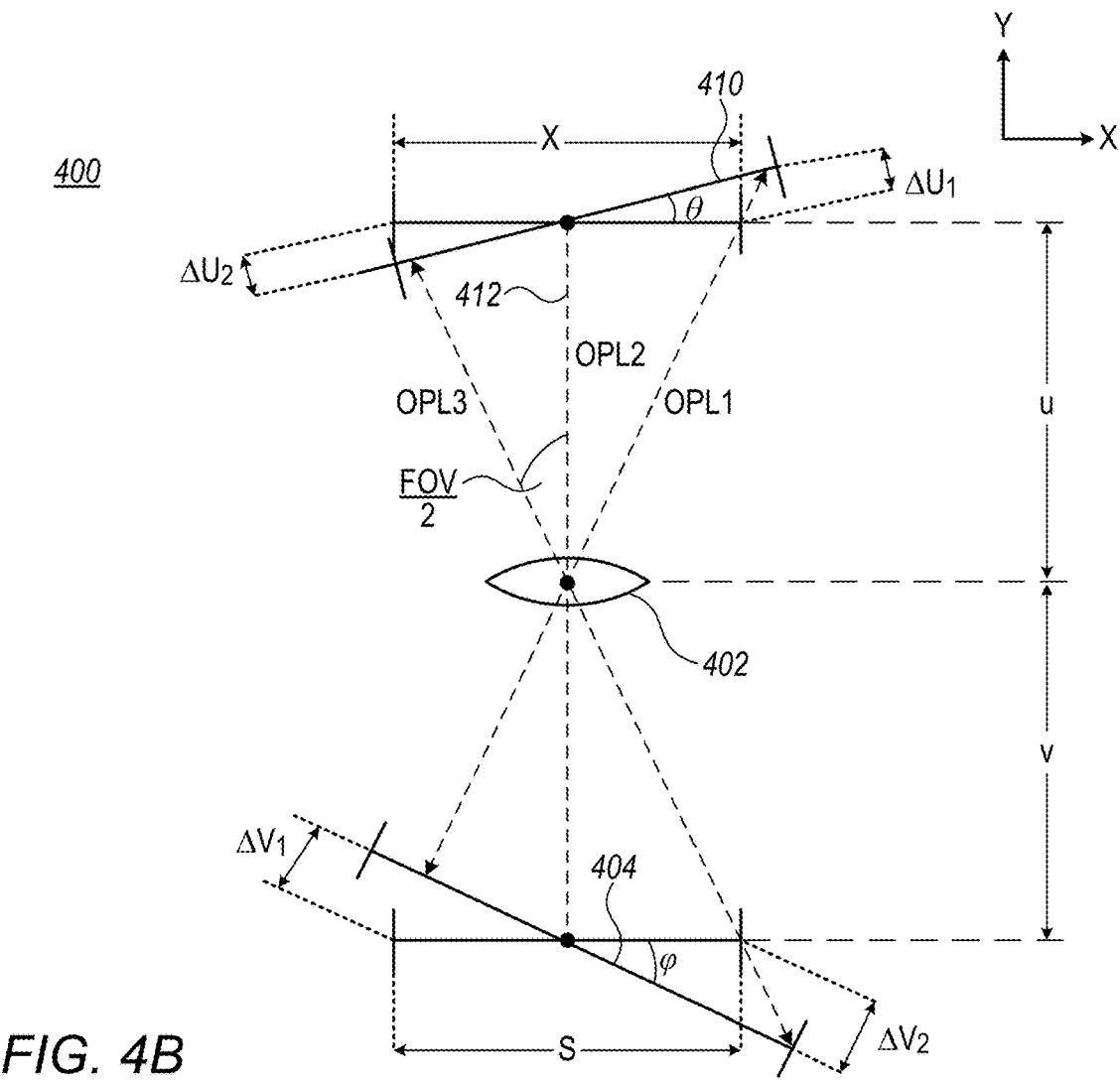
FIG. 4B shows the camera of FIG. 4A in a non-zero tilt focal plane position.

FIGS. 4A-B show the relation between tilting angles $\varphi$ and $\theta$ (as defined in FIG. 3B). For the sake of simplicity, the optical system of double-folded camera 320 is represented by a simpler regular or non-folded camera 400. For not too large angles $\varphi$ for example up to $\varphi=20$ degrees, it can be assumed that tilting an image sensor of a non-folded camera such as image sensor 404 (similar to 308') by angle $\varphi$ with respect to its zero-tilt position at 90 degrees to the camera's OP 412 (similar to 316) leads to a similar tilting angle $\theta$ as one obtains by tilting an I-OPFE such as I-OPFE 322 by the same tilting angle $\varphi$ with respect to its zero-tilt position (at 45 degrees with respect to the double-folded camera's OP 314 and OP 316). It is noted that this implies that focal plane tilting as described herein can be performed not only by a double-folded camera, but also by a regular or non-folded camera. Whereas in a double-folded camera such as 320 an I-OPFE such as 322 is tilted for focal plane tilting, in a regular camera the camera's lens is tilted with respect to the camera's image sensor and a mobile device hosting the regular camera, or the camera's image sensor is tilted with respect to the camera's lens and a mobile device hosting the regular camera.

FIG. 4A shows exemplarily camera 400 in a zero-tilt focal plane position. Camera 400 includes a lens 402 and a tiltable image sensor 404 and it is focused to a focal plane 410 perpendicular to the Y-axis to some object-lens distance u, covering a certain horizontal field of view (FOV) of a scene. Titltable image sensors are known in the art. In FIG. 4A, image sensor 404 is shown in a zero-tilt position. In the zero-tilt position, image sensor 404 is oriented perpendicular to the Y-axis. As known in the art, the optical system is designed so that focal plane 410 is oriented parallel to image sensor 404, parallel to a rear surface of a mobile device (not shown) that hosts camera 400 and perpendicular to OP 412 of camera 400. Three exemplary field (or "object") points (with rays numbered 1-3) are shown: a first field point ("FP1") at a position right of a center of the FOV, a second field point ("FP3") at the FOV center and a third field point ("FP3") at a position left of the FOV center. Designing the optical system so that the focal plane 410 of camera 400 is oriented parallel to image sensor 404 means that fields 1-3 at a same object-lens distance u are in focus. Field points at u are in focus if all rays emerging from this field point propagate a same optical path length ("OPL"), so all rays of FP1, FP2 and FP3 propagate a specific OPL (respectively OPL1, OPL2 and OPL3). OPL1, OPL2 and OPL3 come to lie on focal plane 410. The width of sensor 404 is marked "S", while the width of the FOV is marked "X".

FIG. 4B shows camera 400 in a non-zero tilt focal plane position. Image sensor 404 is now tilted, oriented in a plane not perpendicular to the Y-axis, but forming an angle φ with the X-axis. When image sensor 404 is tilted, OPL1, OPL2 and OPL3 do not come to lie on a focal plane 410 perpendicular to the Y-axis, but on a focal plane 410 that forms some an angle ≠90 degrees with the Y-axis and an angle θ with the X-axis. Object-lens distance u and lens-image distance v are not constant with respect to x such as shown in FIG. 4A, but depend on x, i.e. u=u(x) and v=v(x). For FP1, $u1=u_{center}+\Delta u1$ and $v1=v_{center}+\Delta v1$. For FP3, $u3=u_{center}+\Delta u3$ and $v3=v_{center}+\Delta v3$. "$u_{center}$" and "$v_{center}$" refer to an object-lens distance at a center position of the FOV and a lens-image distance at a center position of the image sensor respectively. For FP2, there is no change, $u2=u_{center}$ and $v2=v_{center}$. We assume that FP1 and FP3 are located symmetrically with respect to FP2, so that $\Delta u1=-\Delta u3$ and $\Delta v1=-\Delta v3$. In the following, we will consider FP1 only. If not stated otherwise explicitly, here and in the following the object-lens distance u refers to $u_{center}$.

The thin lens equation depends now on x, too (equation 1):

$$\frac{1}{EFL} = \frac{1}{u(x)} + \frac{1}{v(x)}$$

Tables 2-4 show exemplarily the relationship of focal plane tilt stroke θ and combinations of SM camera examples (characterized by EFL in mm) and object-lens distances u (in mm) for three image sensor tilt angles φ=5 deg (Table 2), φ2=20 deg (Table 3) and φ3=40 deg (Table 4).

TABLE 2

| | (φ1 = 5deg) | | |
|---|---|---|---|
| | | u(mm) | |
| EFL (mm) | 60 | 100 | 160 |
| 15 | 6.66 | | 5.52 |
| 20 | 7.49 | 6.25 | 5.71 |
| 30 | 9.96 | 7.14 | 6.20 |

TABLE 3

| | (φ2 = 20deg) | | | | |
|---|---|---|---|---|---|
| | | u(mm) | | | |
| EFL (mm) | 60 | 100 | 160 | 500 | 1000 |
| 15 | 26.38 | 23.42 | 22.01 | 20.60 | 20.30 |
| 20 | 29.43 | 24.82 | 22.77 | 20.80 | 20.4 |
| 30 | 37.88 | 28.13 | 24.45 | 21.20 | 20.60 |

TABLE 4

| | (φ3 = 40deg) | | |
|---|---|---|---|
| | u(mm) | | |
| EFL mm | 100 | 500 | 1000 |
| 15 | 46.20 | 41.10 | 40.60 |
| 20 | 48.60 | 41.50 | 40.70 |
| 30 | 54.10 | 42.30 | 41.10 |

From Tables 2-4 it is evident that for tilting the focal plane around a first focal plane rotation axis or a second focal plane rotation axis by a particular focal plane tilt stroke $\theta_P$ ("P" for particular), a particular I-OPFE rotation stroke $\varphi_P$ is required, wherein φp is smaller for closer object-lens distances u. This means that for performing a same focal plane tilt stroke $\theta_P$ at two different object-lens distances $u_1$, $u_2$, wherein $u_1<u_2$, at $u_1$ a smaller amount of rotation (i.e. a smaller rotation stroke $\varphi_P$) of the I-OPFE is required than at u2. In other words, for a particular amount of focal plane tilting the following is fulfilled: the smaller the object-lens distance, the smaller the required I-OPFE rotation stroke $\varphi_P$ to achieve the particular amount of focal plane tilting.

The tilting of the focal plane may be by controlled by a human user or automatically by an algorithm.

FIG. 4C shows an embodiment of a method for automatic control of focal plane tilting disclosed herein. In a first step 422, an object of interest ("OOI") detector such as OOI detector 742 (FIG. 7) may detect an OOI and its position within a SM camera's FOV. The OOI may be selected by a user and/or proposed by an algorithm, e.g. by using a saliency map or an object detection algorithm. In some embodiments, OOI detector 742 may use Wide (W) or Ultrawide (UW) image data for detecting an OOI. In step 424, a tilt estimator such as tilt estimator 744 (FIG. 7) may calculate a relative tilt between the SM camera's focal plane and the OOI. For tilt estimation, image data from the SM or the W or UW camera may be used, e.g. RGB or photodiode autofocus (PDAF) image data. In other embodiments, depth map data from an additional camera, e.g. from a Time-of-Flight (TOF) camera may be used. Based on the tilt estimation, in step 426 I-OPFE control 746 (FIG. 7) may use calibration data such as presented in Table 2-4, e.g. as a Look-Up-Table (LUT), to calculate I-OPFE control signals that are transmitted to an I-OPFE actuator (such as I-OPFE actuator 724) which tilts the focal plane in order to align the SM camera's focal plane with OOI's orientation.

The calibration data may include tilt angles of four I-OPFE rotation axes and object-lens distances for controlling the tilting of the focal plane around two focal plane rotation axes. The calibration data may include tilt angles of two I-OPFE rotation axes and object-lens distances for controlling the tilting of the focal plane around one focal plane rotation axis. In other embodiments, the focal plane may not be aligned with the OOI orientation, but the focal plane and the OOI orientation may be tilted with respect to each other in a defined way, so that an artistic (or aesthetic) combination of in-focus and out-of-focus segments in the SM image are formed. For example, the artistic combination of in-focus and out-of-focus segments in the SM image may be a Bokeh effect that can be controlled via focal plane tilting. In some examples, the artistic combinations may be used to highlight particular objects or particular segments of a scene.

In other examples referring to a regular or non-folded camera, in step 426 a lens tilt controller or an image sensor tilt controller may use calibration data to calculate lens control signals or image sensor control signals that tilt the focal plane by tilting the camera's lens and/or the camera's image sensor in order to align the focal plane and OOI's orientation.

In yet other examples referring to a camera that has an optical path which is folded more than twice, e.g. 3 times or 4 times or more, in step 426 an OPFE tilt controller may use calibration data to calculate OPFE control signals that tilt the focal plane by tilting one of the camera's OPFEs by means of an OPFE actuator in order to align the focal plane and the OOI orientation. A camera that has an optical path which is folded 3 times or 4 times respectively includes two or more OPFEs (e.g. prisms and/or mirrors) and has 4 optical path segments OP1-OP4 or 5 optical path segments OP1-OP5 respectively, wherein consecutive OPs (such as OP1 and OP2 etc.) may be oriented at an angle of 90 degrees relative to each other or they may be oriented at another angle.

In step 428, a SM image is captured. In some embodiments, a plurality of SM images is captured that together form a video stream. In some examples, different artistic combinations of in-focus and out-of-focus segments in particular SM images of the video stream may be used to highlight particular objects or particular segments of a scene.

In some embodiments and for a scanning SM camera, W image data may be used to steer the native $FOV_N$ of the scanning SM camera to an OOI.

FIG. 5A shows an example of a mobile device numbered 500 that includes a double-folded SM camera 502 with a tiltable focal plane as disclosed herein. Mobile device 500 includes a multi-camera that comprises, in addition to a Tele camera that acts as SM camera 502, a Wide (or "W") camera 504 having a Wide $FOV_W$ and an Ultra-Wide (or "UW") camera 506 having an Ultra-Wide $FOV_{UW}$. The multi-camera is integrated in the rear-facing (or world-facing) surface 508 of mobile device 500. Mobile device 500 may include some or all of components of mobile device 700. Mobile device 500 may for example be a smartphone.

Figure 5B:
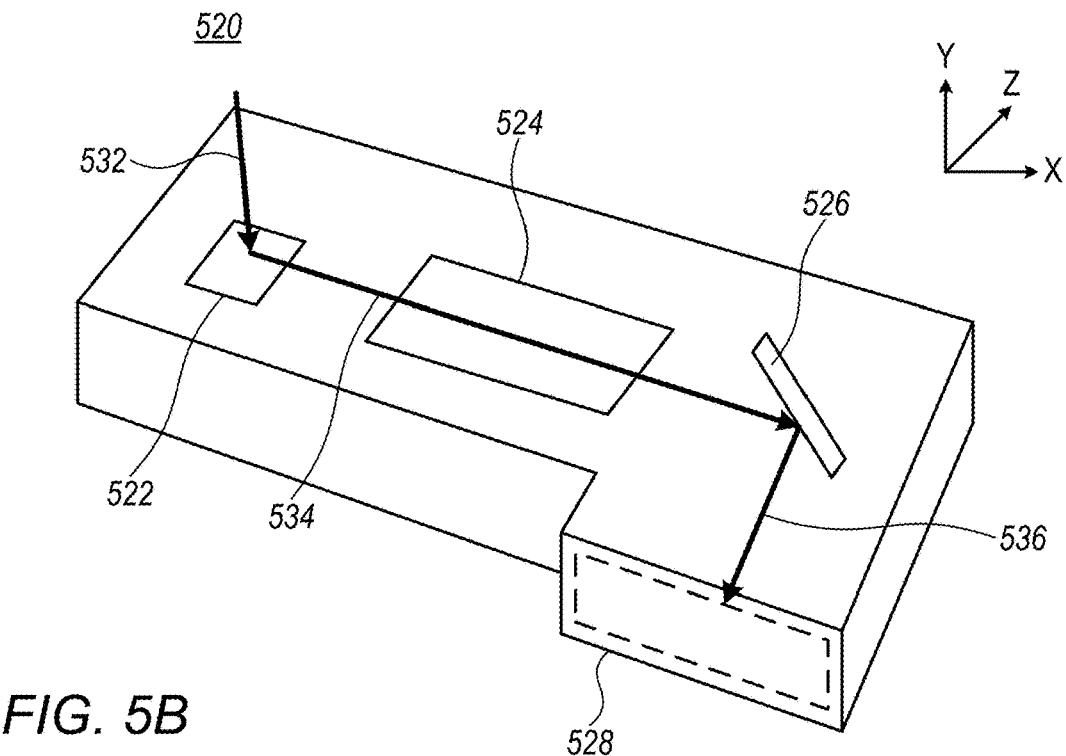
FIG. 5B shows a known art double-folded Tele camera in a perspective view.

FIG. 5B shows a known art double-folded Tele camera 520 in a perspective view. Camera 520 includes an object OPFE 522 (e.g. a prism), a lens 524, an I-OPFE 526 (e.g. a mirror) and an image sensor 528. Camera 520 has three OPs, OP1 532, OP2 534 and OP3 536. Double-folded Tele camera 520 is implemented according to the first example as described above, i.e. OP1 532 is parallel to the Y-axis, OP2 534 is parallel to the X-axis, OP3 536 is parallel to the Z-axis. Image sensor 528 is oriented in a plane parallel to the X-Y plane.

Figure 6A:
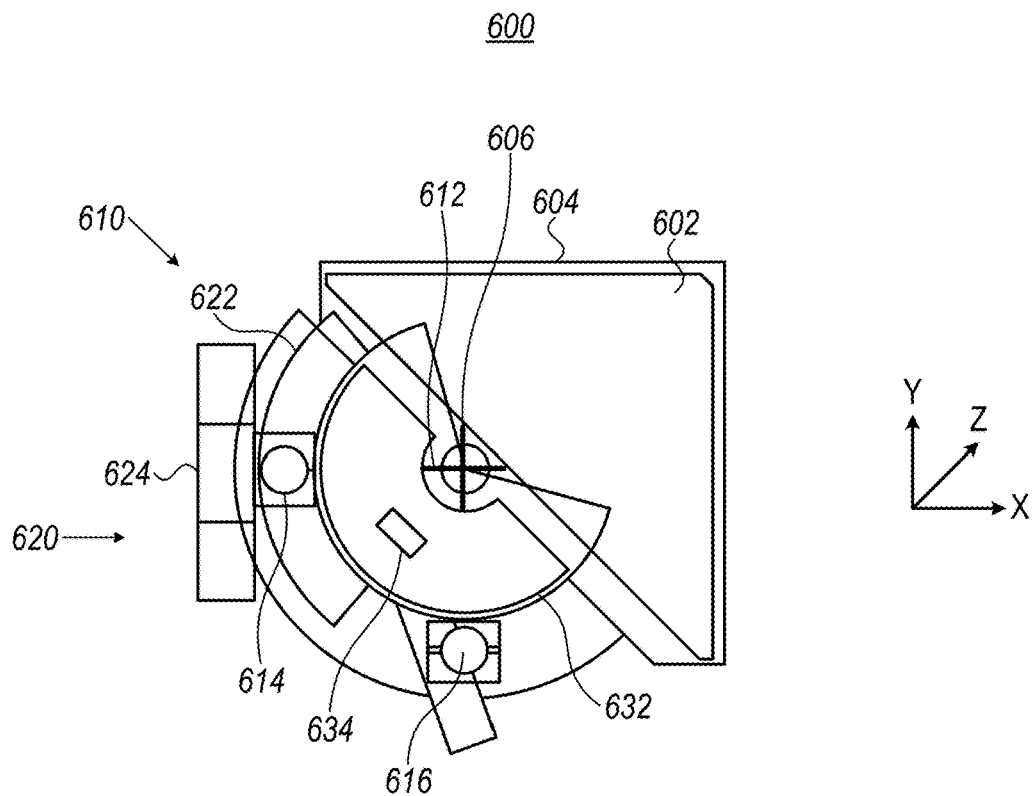
FIG. 6A shows an I-OPFE module disclosed herein from a top view.
Figure 6B:
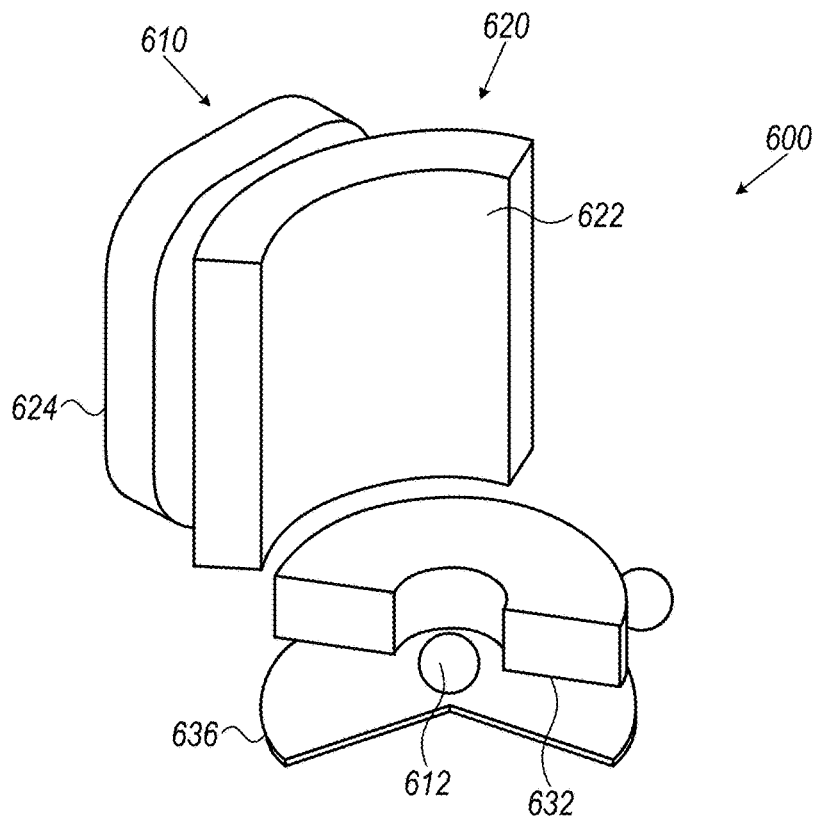
FIG. 6B shows the I-OPFE module of FIG. 6A without an I-OPFE and without an OPFE holder in a perspective view.
Figure 6C:
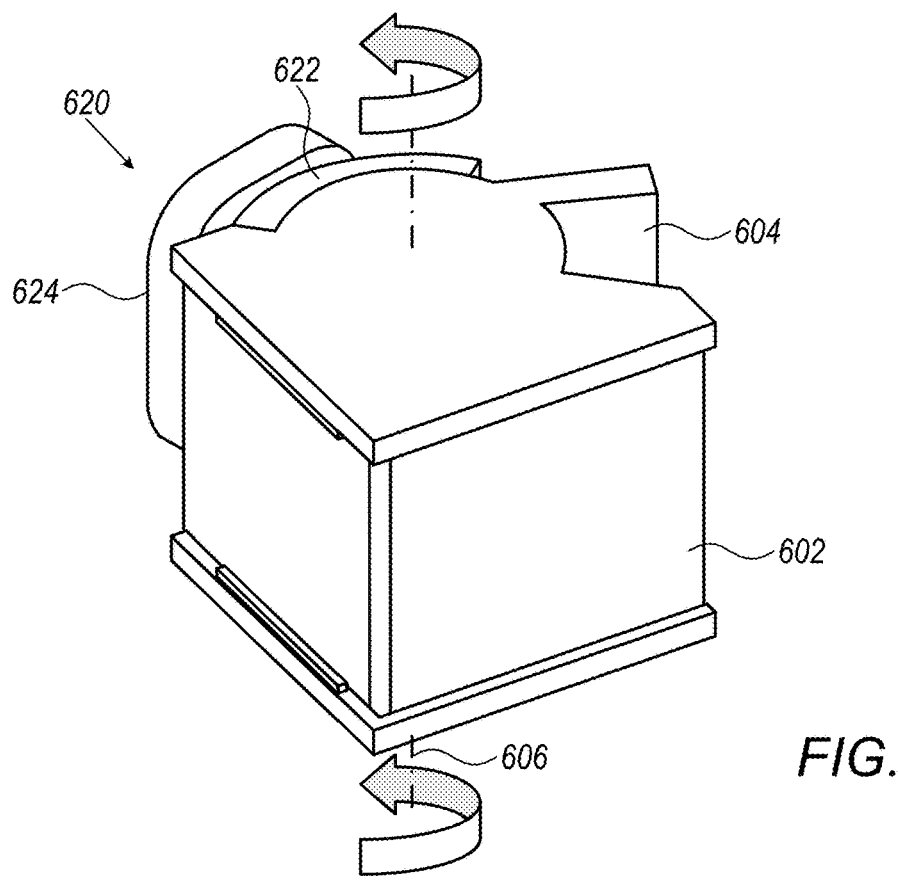
FIG. 6C shows the I-OPFE module in the same perspective view as FIG. 2B, but with the I-OPFE and the OPFE holder shown.

FIG. 6A-C shows a tiltable I-OPFE module 600 that enables tilting an OPFE in a range of about ±30 degrees. FIG. 6A shows I-OPFE module 600 as from a top view. I-OPFE module 600 comprises an I-OPFE 602 (e.g. a mirror or a prism) in an OPFE holder 604, and an OPFE tilt mechanism 610. OPFE tilt mechanism 610 rotates I-OPFE 602 around one axis of rotation 606 located at pivot ball 612 and parallel to the Z-axis. Support balls 614 and 616 mediate the rotation. OPFE tilt mechanism 610 also comprises a voice coil motor ("VCM") actuator 620 that has a VCM magnet 622 and a VCM coil 624 for rotational actuation. The VCM actuation is sensed by a sensing and compression magnet 632 and a Hall sensor 634.

FIG. 6B shows OPFE module 600 without I-OPFE 602 and OPFE holder 604 in a perspective view. Yoke 636 is visible. FIG. 6C shows OPFE module 600 in the same perspective view as FIG. 2B, but with I-OPFE 602 and OPFE holder 604 shown. The axis of rotation 606 is marked.

By using two separate magnets 622 and 632, OPFE module 600 allows for separation of sensing and actuation. Hall sensor 634 is decoupled from the magnetic field of coil 624. Rotation axis 606 is at relatively large distance from VCM actuator 620, providing a large lever for rotational actuation. Rotation axis 606 is at relatively short distance from Hall sensor 634 so that sensing of large rotational OPFE actuation can be performed within a small stroke.

Figure 7:
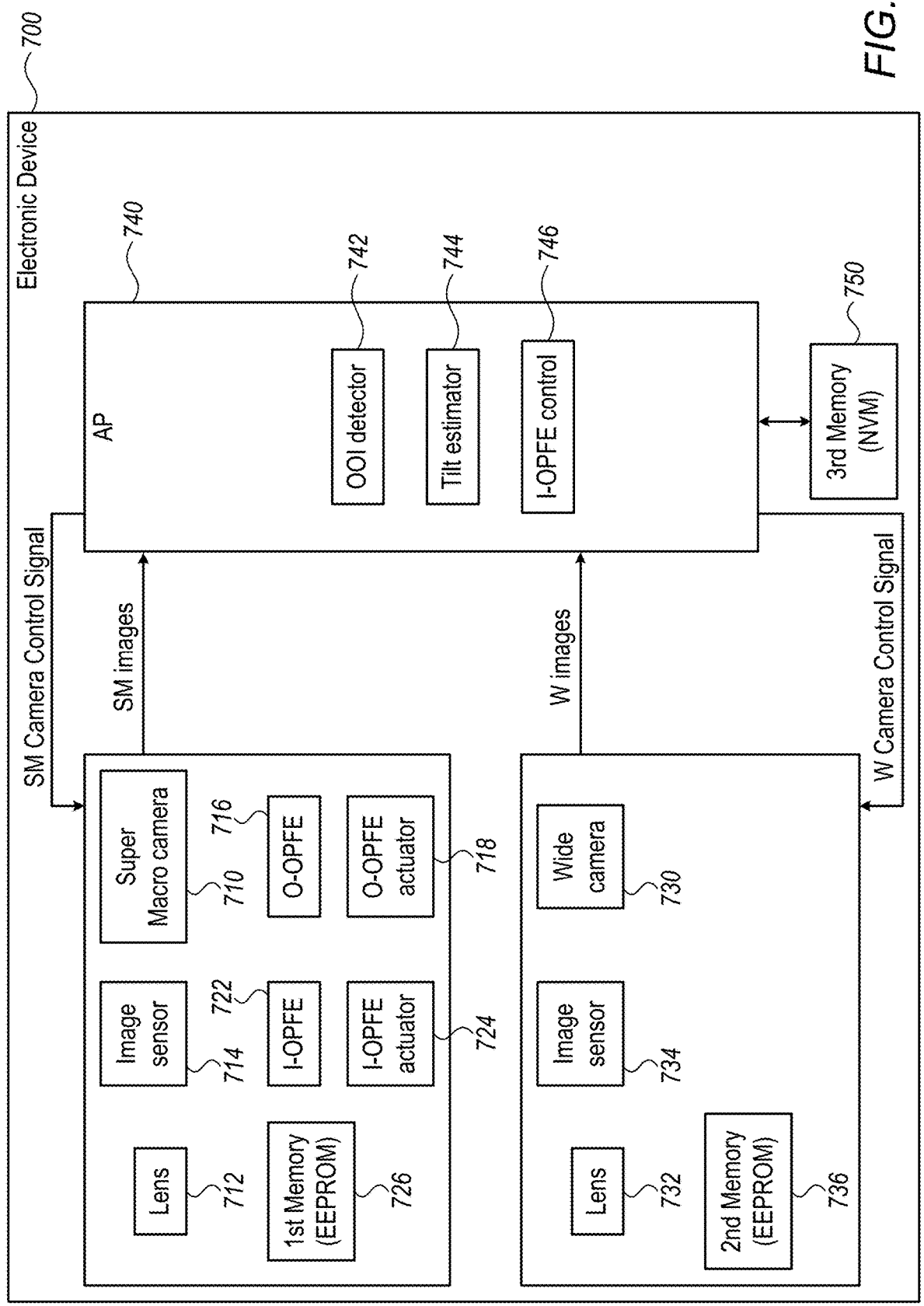
FIG. 7 shows schematically an embodiment of a mobile device capable of tilting a focal plane disclosed herein.

FIG. 7 shows schematically an embodiment of a mobile device (e.g. a smartphone) capable of tilting a focal plane disclosed herein and numbered 700. Mobile device 700 comprises a SM camera 710 which is a double-folded camera that includes a lens 712, an image sensor 714, an O-OPFE 716 and an O-OPFE actuator 718, an I-OPFE 722 and an I-OPFE actuator 724, both for rotational actuation of O-OPFE and I-OPFE respectively. Rotational actuation of I-OPFE is performed for a method disclosed herein. Calibration data for rotational actuation of I-OPFE according to a control signal from I-OPFE control 744 is stored on a first memory 726 (e.g. an EEPROM or "electrically erasable programmable read-only memory") or on a third memory 750 (e.g. a NVM or "non-volatile memory"). SM lens 712 may have a fixed EFL providing a fixed zoom factor (ZF), or an adaptable EFL providing an adaptable ZF. The adaptation of the focal length may be discrete or continuous, i.e. a discrete number of varying focal lengths for providing two or more discrete zoom states having particular respective ZFs, or the adaptation of the ZF may be continuous. O-OPFE actuator 718 and I-OPFE actuator 724 may actuate O-OPFE 716 and I-OPFE 722 respectively for focal plane tilting, OIS and, in case SM camera 710 is a scanning folded camera, for FOV scanning. I-OPFE actuator 724 may actuate I-OPFE 722 around two perpendicular axes, in dependence of a desired focal plane tilt direction.

Mobile device 700 further comprises a W camera module 730 including a W lens 732, an image sensor 734 and a second memory 736.

Mobile device 700 may further comprise an application processor (AP) 740. AP 730 comprises an OOI detector 742, a tilt estimator 744 for estimating a relative tilt between mobile device 700 and an OOI that is to be captured. The tilt estimation of 744 is used by I-OPFE control 746 to calculate control signals for I-OPFE actuator 724 which rotates I-OPFE 722 according to the control signals.

SM camera 710 may have an EFL of e.g. 7 mm-50 mm or more, a diagonal FOV of 5 degree and a f number of f/#=1.5-7.5. W camera 730 may have an EFL of e.g. 2.5 mm-15 mm, a diagonal FOV of 50 deg-130 deg and f/#=1.0-3.5.

SM camera 710 may be a scanning camera. By rotational actuation of O-OPFE 716 and I-OPFE 722, the native (diagonal) FOV ($FOV_N$) of SM camera 710 can be steered for scanning a scene. $FOV_N$ may be 10-40 degrees, and a scanning range of $FOV_N$ may be ±5 degree-±35 degree. For example, a scanning SM camera with 20 degree $FOV_N$ and ±20 $FOV_N$ scanning covers a Tele FOV of 60 degree.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. A camera, comprising:
   an object side optical path folding element (O-OPFE) for folding a first optical path (OP1) to a second optical path (OP2);
   a lens;
   an image side optical path folding element (I-OPFE) for folding OP2 to a third optical path (OP3), wherein OP1 and OP2 and OP3 are perpendicular to each other;
   an I-OPFE actuator; and
   an image sensor with an image plane oriented parallel to a X-Y plane in an exemplary orthogonal XYZ coordinate system,
   wherein the camera is a super-Macro (SM) camera and has a focal plane, wherein in a zero-tilt focal plane position the focal plane is parallel to a X-Z plane, wherein in a zero-tilt I-OPFE position the I-OPFE forms an angle of 45 degrees with both the X-axis and the Z-axis and is parallel to the Y-axis, wherein the I-OPFE actuator is operative to tilt the focal plane around a first focal plane rotation axis that is parallel to the Z-axis by rotational actuation of the I-OPFE around a first I-OPFE rotation axis that is parallel to the Y-axis, and/or to tilt the focal plane around a second focal plane rotation axis parallel to the X-axis by rotational actuation of the I-OPFE around a second I-OPFE rotation axis that is parallel to the zero-tilt I-OPFE position and perpendicular to the Y-axis.

2. The camera of claim 1, wherein OP1 and OP3 are oriented parallel to the Y-axis and OP2 is oriented parallel to the X-axis, wherein the image sensor is oriented parallel to the X-Z plane, wherein the I-OPFE actuator is operative to tilt the focal plane around the first focal plane rotation axis by rotational actuation of the I-OPFE around a third I-OPFE rotation axis that is parallel to the Z-axis, and/or to tilt the focal plane around the second focal plane rotation axis by rotational actuation of the I-OPFE around a fourth I-OPFE rotation axis that is parallel to the zero-tilt I-OPFE position and perpendicular to the Z-axis.

3. The camera of claim 1, wherein the SM camera is focused to object-lens distances of 3.0-15 cm.

4. The camera of claim 1, wherein the SM camera is focused to object-lens distances of 15-50 cm.

5. The camera of claim 1, wherein the focal plane is tilted by 0-20 degrees around the first focal plane rotation axis and/or the second focal plane rotation axis.

6. The camera of claim 5, wherein the I-OPFE is tilted by 0-20 degrees around the first I-OPFE rotation axis or the third I-OPFE rotation axis for tilting the focal plane by 0-20 degrees around the first focal plane rotation axis, and/or the I-OPFE is tilted by 0-20 degrees around the second I-OPFE rotation axis or the fourth I-OPFE rotation axis for tilting the focal plane by 0-20 degrees around the second focal plane rotation axis.

7. The camera of claim 1, wherein the focal plane is tilted by 0-40 degrees around the first focal plane rotation axis and/or the second focal plane rotation axis.

8. The camera of claim 7, wherein the I-OPFE is tilted by 0-40 degrees around the first I-OPFE rotation axis or the third I-OPFE rotation axis for tilting the focal plane by 0-40 degrees around the first focal plane rotation axis and/or the I-OPFE is tilted by 0-40 degrees around the second I-OPFE rotation axis or the fourth I-OPFE rotation axis for tilting the focal plane by 0-40 degrees around the second focal plane rotation.

9. The camera of claim 1, wherein the focal plane is tilted by 0-60 degrees around the first focal plane rotation axis and/or the second focal plane rotation axis.

10. The camera of claim 1, wherein the focal plane is tilted by 0-80 degrees around the first focal plane rotation axis and/or the second focal plane rotation axis.

11. The camera of claim 1, wherein calibration data is used to calculate control signals for tilting the focal plane around the first focal plane rotation axis and the second focal plane rotation axis, and wherein the calibration data is dependent on the distance between the SM camera and an object to be captured.

12. The camera of claim 1, wherein a first rotation stroke around the first or the second or the third or the fourth I-OPFE rotation axis is required for tilting the focal plane around the first focal plane rotation axis or the second focal plane rotation axis by a particular focal plane tilt stroke when the focal plane is located at a first distance from the SM camera, wherein a second rotation stroke around the first or the second or the third or the fourth I-OPFE rotation angle is required for tilting the focal plane around the first focal plane rotation axis or the second focal plane rotation axis by the same particular focal plane tilt stroke when the focal plane is located at a second distance from the SM camera, wherein the second distance is larger than the first distance, and wherein the first rotation stroke is smaller than the second rotation stroke.

13. The camera of claim 1, wherein the SM camera has an effective focal length of 7-10 mm.

14. The camera of claim 1, wherein the SM camera has an effective focal length of 10-20 mm.

15. The camera of claim 1, wherein the SM camera has an effective focal length of 20-40 mm.

16. The camera of claim 1, wherein the I-OPFE actuator is a voice coil motor.

17. The camera of claim 1, wherein the I-OPFE is a mirror.

18. The camera of claim 1, wherein the O-OPFE is a prism.

19. The camera of claim 1, wherein the lens is partitioned into two lens groups, wherein a first lens is located at an object side of the O-OPFE and a second lens group is located between an image side of the O-OPFE and an object side of the I-OPFE.

20. The camera of claim 1, wherein the SM camera is a scanning camera that scans a scene with a respective SM field-of-view.

21. The camera of claim 1, wherein the SM camera can be switched between two or more discrete zoom states.

22. The camera of claim 1, wherein the SM camera can be switched continuously between a minimum zoom state and a maximum zoom state.

23. The camera of claim 1, wherein a zoom factor of a maximum zoom state is twice a zoom factor of a minimum zoom state.

24. The camera of claim 1, wherein a zoom factor of a maximum zoom state is 2 or more times larger than a zoom factor of a minimum zoom state.

25. A mobile device comprising the SM camera of claim 1 and including an application processor (AP) configured to control the tilting of the focal plane.

26. The mobile device of claim 25, wherein the mobile device is a smartphone.

27. The mobile device of claim 25, wherein the AP is configured to use calibration data including rotation angles of the first and/or the second and/or the third and/or the fourth I-OPFE rotation axes, and object-lens distances for controlling the tilting of the focal plane around the first and/or the second focal plane rotation axes.

28. The mobile device of claim 25, wherein the AP is configured to control the tilting of the focal plane according to a user input.

29. The mobile device of claim 25, wherein the AP is configured to run an algorithm to tilt the focal plane automatically.

30. The mobile device of claim 29, wherein the focal plane is tilted so that an object of interest captured with the SM camera is entirely in-focus.

31. The mobile device of claim 29, wherein the focal plane is tilted so that an object of interest captured with the SM camera has a specific amount of out-of-focus deblur.

32. The mobile device of claim 29, further comprising a Wide camera and/or an Ultra-Wide camera, wherein the AP is additionally configured to analyze image data from any of the SM camera, the Wide camera, or the Ultra-Wide camera for tilting the focal plane automatically.

33. The mobile device of claim 32, wherein the image data is photodiode autofocus image data.

34. The mobile device of claim 32, wherein the analysis of image data uses a saliency map and/or an object detection algorithm.

35. The mobile device of claim 32, wherein the AP is configured to analyse image data from the Wide camera or the Ultra-Wide camera to steer a field-of-view (FOV) of the scanning camera towards a specific segment within a FOV of the Wide camera.

36. The mobile device of claim 32, wherein the AP is configured to analyse image data from the Wide camera or the Ultra-Wide camera to switch the SM camera to a specific zoom state for capturing Macro images which have a specific magnification and a specific field-of-view.

37. The mobile device of claim 25, wherein the AP is additionally configured to automatically capture an image or a stream of images after the focal plane is tilted.

* * * * *